United States Patent Office 3,096,747
Patented July 9, 1963

3,096,747
FUEL INJECTION SYSTEM FOR ROTARY ENGINES
Hiroshi Tado, Suita-shi, Osaka, Japan, assignor to Yanmar Diesel Engine Co., Ltd., Osaka, Japan, a corporation of Japan
Filed May 28, 1962, Ser. No. 198,267
Claims priority, application Japan June 23, 1961
1 Claim. (Cl. 123—8)

The present invention relates to rotary engines and particularly to the arrangement of fuel injection systems thereon.

One of the characteristic features of a rotary engine is its high operational speed and compactness. That is, a rotary engine is markedly compact as contrasted to a conventional reciprocatory engine. Auxiliary units such as a governor and a fuel supply system for the rotary engine, however, occupy substantially the same volumes as those on a conventional reciprocating engine having the same power output despite marked reduction in volume of the rotary engine per se. Therefore, it is difficult to make the best of the above advantage of a rotary engine to make the entire assembly compact and streamlined by use of any previous arrangement of auxiliaries. With general-purpose rotary engines of the single- or two-rotor type, a mechanical governor is indispensable while with most of injection ignition type engines in which fuel is directly injected into the combustion chamber an ignition timing controlling unit is necessary. The present invention has for its object to make the entire engine compact and easy to use by centralizing the fuel injection system, that is, by collecting the fuel injection unit and controlling units therefor in a position such as to facilitate their handling. According to the present invention, there is provided a fuel injection system for a rotary engine having a rotor or rotors, a rotor shaft, a rotor housing, a side cover for the housing and an auxiliary unit casing provided adjacent to the side cover, comprising a centrifugal governor mounted on the top wall of the auxiliary unit casing so as to be driven by a vertical shaft therein, which vertical shaft is gear driven by that portion of said rotor shaft extending into said auxiliary unit casing, a fuel injection pump including a fuel pump casing proper formed integrally with said auxiliary unit casing and a horizontal cam shaft extending at right angles to said rotor shaft, a fuel supply pump adapted to be driven by an eccentric cam mounted on the outer end of said cam shaft, and a fuel injection pump drive means with a fuel injection timing control provided on the inner end of said cam shaft and drivingly interconnect said rotor shaft and said cam shaft in variable phase relationship.

The present invention will now be described with reference to the following drawings.

FIG. 3 is a cross section taken on the plane of the line C—C of FIG. 1.

Figure 1:
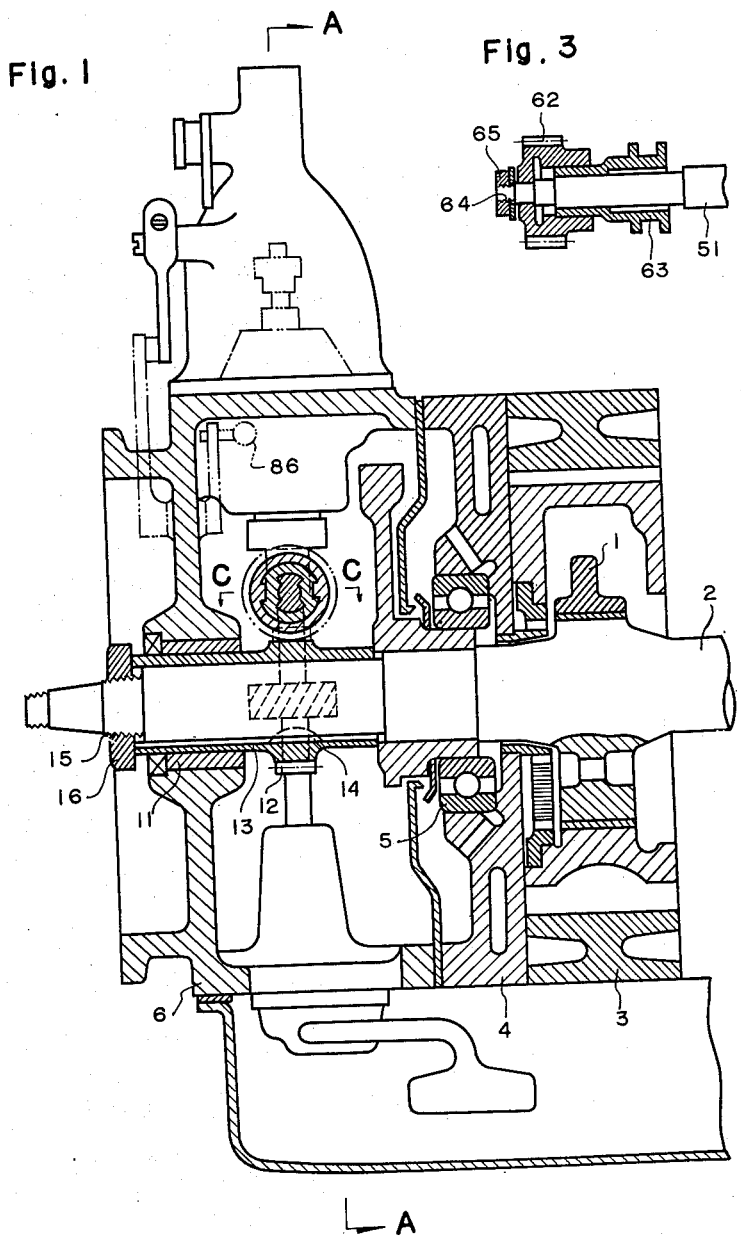
FIG. 1 is a fragmentary longitudinal cross section of a rotary engine having a fuel injection system of the present device taken on the plane of the line B—B of FIG. 2 including the rotor axis.

The illustrated engine, having a fuel injection system according to the present invention, forms a so-called rotary engine comprising a rotor 1 and a rotor shaft 2 rotatably supporting said rotor, and a rotor housing 3 the inner periphery of which defines a multi-lobe epitrochoidal chamber within the housing 3, said rotor being rotatable maintaining its edges in sliding engagement with the inner surface of the chamber. The housing carries a side cover 4 and the rotor shaft 2 is journaled in a bearing 5 in said side cover 4. Provided outside of and adjacent to the side cover 4 is an auxiliary unit casing 6 on which engine auxiliaries such as a fuel injection pump 7, a governor 8 and a lubricant pump 9 are mounted collectively.

The rotor shaft extends through the auxiliary unit casing 6 and is journaled at the outer end in an outside bearing 11. A sleeve 13 formed with a gear 12 is mounted on that portion of the rotor shaft 2 extending within the auxiliary unit casing against rotation relative to the rotor shaft by means of a key 14. The sleeve 13 is immovably secured at the outer end to the rotor shaft by means of a threaded portion 15 formed on the rotary shaft at the outer end thereof and a cooperating nut 16.

Arranged in the auxiliary unit casing 6 is a vertical shaft 22 having a gear 21 mounted thereon in meshing relation to the gear 12. The vertical shaft 22 is thus arranged so as to be driven from the rotor shaft by way of gears 12 and 21.

The vertical shaft 22 is journaled at the bottom thereof in an aperture formed in the bottom wall of the auxiliary unit casing 6 and is connected with the drive shaft of the lubricant pump 9, which is thus adapted to be drivingly rotated by the shaft 22. The top end of the shaft 22 is connected with the bottom end of a rotatable spindle of the centrifugal governor 8 mounted on the exterior surface of the top wall of the auxiliary unit casing 6, whereby the governor may be driven by the rotation of the shaft 22. The governor 8 per se is of the same construction as conventional ones, having weights 31 carried by the rotary shaft of the governor spindle to rotate therewith and pivot about the pivot studs 32 under centrifugal forces so that the shaft 36 is raised against the bias of a spring 37 as the ends of the lower arms 33 are moved upwardly.

The rising movement of the shaft 36 is converted to a fuel injection reducing movement of an injection control for the injection pump 7 by a linkage interconnecting the shaft 36 and the injection control. The mechanism for the purpose will be described hereinafter.

The tension of the spring 37 is adjustable by vertical movement of a seat 41 against which the top end of the spring abuts. The seat 41 is slidably fitted in a vertical bore 42 formed in the top portion of the governor casing and is formed on one side with a rack 43, which is in mesh with a gear segment formed on the opposite end of a speed control lever 46 pivoted at 45 to the governor casing. It will be understood, therefore, that by manually vertically turning the lever 46 the seat 41 may be moved vertically to vary the tension of the spring 37 thereby to control the speed at which the governor acts.

A portion of the wall of the auxiliary unit casing 6 forms the body 50 of a fuel injection pump casing. The body 50 of the pump casing has a cam shaft 51 for driving the fuel injection pump, which shaft is horizontal and is arranged at right angles to the rotor shaft 2. The cam shaft 51 is journaled in bearings 53 and 54 mounted in the body 50 and extends inwardly to a point over the rotor shaft 2, being connected with a gear 12 on the latter by a mechanism for controlling the timing of fuel injection.

The mechanism for controlling the timing of fuel injection will now be described. A gear 62 is disposed in mesh with the gear 12 on the rotor shaft. The left-hand side portion of the gear, which is cup-shaped, is mounted rotatably but axially immovably on the cam shaft 51, by means of a threaded portion 64 formed on the inner end thereof and a nut 65 cooperating with the threaded portion. The right-hand side portion carries axial ridges on the inside thereof. The ridges are slidably received in axial grooves formed in the outside of a sleeve 63 at the inner end thereof. Helical grooves are formed on the inside of the sleeve 63 to slidably receive the ridges on the cam shaft. It will be understood that the power for fuel pump drive is transmitted through gear 12, gear 62 and the sleeve 63 to the cam shaft 51. Formed at the opposite end of the sleeve are two opposite spaced flanges between which a shifter 68 is interposed. The shifter has trunnions fitted in the bottom end of a shifter lever 67 pivoted at 66 to the auxiliary unit casing. The shifter lever 67 is formed at the top with a gear segment in mesh with a pinion 69 which is secured to a shaft 70 rotatably journaled in the side walls of the governor casing disposed atop of the auxiliary unit casing. The shaft 70 extends through one of the side walls to carry an injection timing control lever 71 secured fast to the extended shaft end.

As the control lever is manually moved right and left, the pinion 69 rotates to cause pivotal movement of the shifter lever through the gear segment meshing with the pinion. This pivotal movement causes sliding movement of the sleeve along the axis of the cam shaft. The sliding movement of the sleeve causes angular displacement or rotation of the cam shaft because of the interfitting relation of the two members including helical ridges. The outside gear 62 is circumferentially integral with the sleeve because of their interfitting relation including axial ridges, and thus varies in angular phase relative to the cam shaft to effect control of the injection timing.

Figure 2:
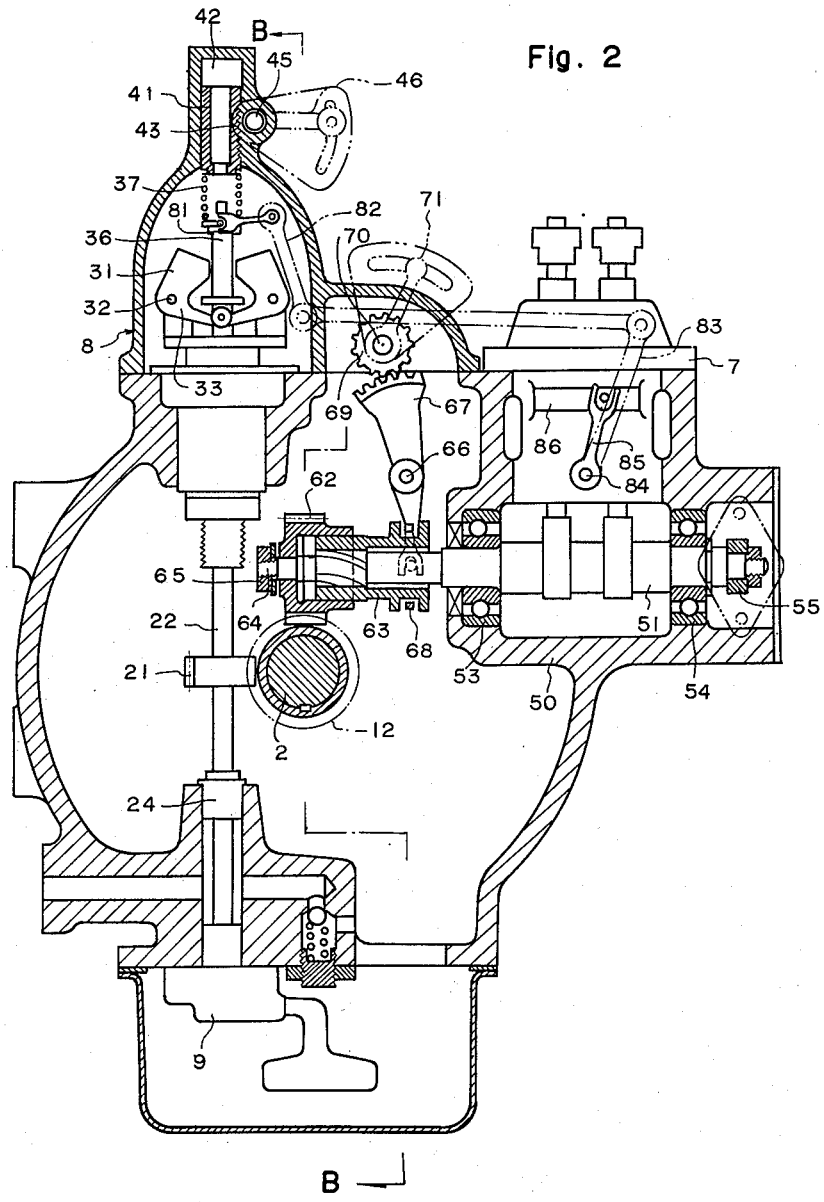
FIG. 2 is a vertical cross section taken on the plane of the line A—A of FIG. 1.

The pinion used in the embodiment shown in FIG. 2 may be replaced by a rack with a hydraulic pressure applied on one end face thereof for effecting remote control.

The cam shaft has an eccentric cam 55 secured to the opposite end thereof for driving a fuel supply pump.

Next, the mechanism of the fuel injection control will be described. The rise of the shaft 36 causes a pivotal movement of the bifurcated lever 81, which in turn causes a pivotal movement of the first lever 82 by way of the rotary shaft and hence a pivotal movement of the second lever 83 through a connecting link. The movement of the second lever 83 causes a bifurcated lever 85 to pivot by way of a rotary shaft 84, which causes a movement of a rack 86 so as to diminish the amount of fuel injection.

What is claimed is:

A fuel injection system for a rotary engine comprising a rotor or rotors, a rotor shaft, a rotor housing, a side cover for the housing and an auxiliary unit casing provided adjacent to the side cover, characterized by the fact that the system comprises a centrifugal governor mounted on the top wall of the auxiliary unit casing so as to be driven by a vertical shaft therein, which vertical shaft is gear-driven by that portion of said rotor shaft extending into said auxiliary unit casing, a fuel injection pump including a fuel pump casing proper formed integrally with said auxiliary unit casing and a horizontal cam shaft extending at right angles to said rotor shaft, a fuel supply pump adapted to be driven by an eccentric cam mounted on the outer end of said cam shaft, and a fuel injection pump drive means with a fuel injection timing control provided on the inner end of said cam shaft and drivingly interconnecting said rotor shaft and said cam shaft in variable phase relationship.

No references cited.